US011195558B2

(12) United States Patent
Ueno

(10) Patent No.: US 11,195,558 B2
(45) Date of Patent: Dec. 7, 2021

(54) IMAGING APPARATUS AND DISPLAY CONTROL METHOD

(71) Applicant: CANON KABUSHIKI KAISHA, Tokyo (JP)

(72) Inventor: Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/848,368

(22) Filed: Apr. 14, 2020

(65) Prior Publication Data
US 2020/0342913 A1 Oct. 29, 2020

(30) Foreign Application Priority Data

Apr. 26, 2019 (JP) .............................. JP2019-085968

(51) Int. Cl.
G11B 27/36 (2006.01)
G11B 27/34 (2006.01)
H04N 5/77 (2006.01)
H04N 1/32 (2006.01)
H04N 1/00 (2006.01)
H04N 1/21 (2006.01)
H04N 5/232 (2006.01)

(52) U.S. Cl.
CPC .............. G11B 27/36 (2013.01); G11B 27/34 (2013.01)

(58) Field of Classification Search
None
See application file for complete search history.

(56) References Cited

U.S. PATENT DOCUMENTS

| 5,862,409 | A | * | 1/1999 | Yoshimoto | G06F 5/10 710/57 |
| 2014/0204243 | A1 | * | 7/2014 | Hayashi | H04N 9/79 348/231.99 |
| 2015/0371450 | A1 | * | 12/2015 | Peterson | H04N 13/271 345/419 |
| 2016/0371182 | A1 | * | 12/2016 | Herrmann | H04L 49/90 |
| 2017/0150091 | A1 | * | 5/2017 | Nakase | H04N 5/772 |
| 2019/0124255 | A1 | * | 4/2019 | Ueguri | H04N 5/232939 |
| 2020/0267325 | A1 | * | 8/2020 | Takahashi | H04N 5/232933 |

FOREIGN PATENT DOCUMENTS

| JP | 2005-026807 A | * | 1/2005 | ............... H04N 5/92 |
| JP | 2006-325148 A | | 11/2006 | |

* cited by examiner

Primary Examiner — Hung Q Dang
(74) Attorney, Agent, or Firm — Canon U.S.A., Inc. IP Division

(57) ABSTRACT

An imaging apparatus includes a storing unit configured to, when recording pieces of image data obtained by an imaging unit on a plurality of recording media, respectively temporarily store the pieces of image data obtained by the imaging unit in a plurality of storage regions corresponding to the plurality of recording media, a recording control unit configured to perform control to respectively record the pieces of image data temporarily stored in the plurality of storage regions on the plurality of recording media corresponding to the plurality of storage regions, and a display control unit configured to perform control to display information indicating a use status of a storage region on a display unit, wherein the display control unit performs control to display information indicating the use status only with respect to one storage region out of the plurality of storage regions.

20 Claims, 9 Drawing Sheets

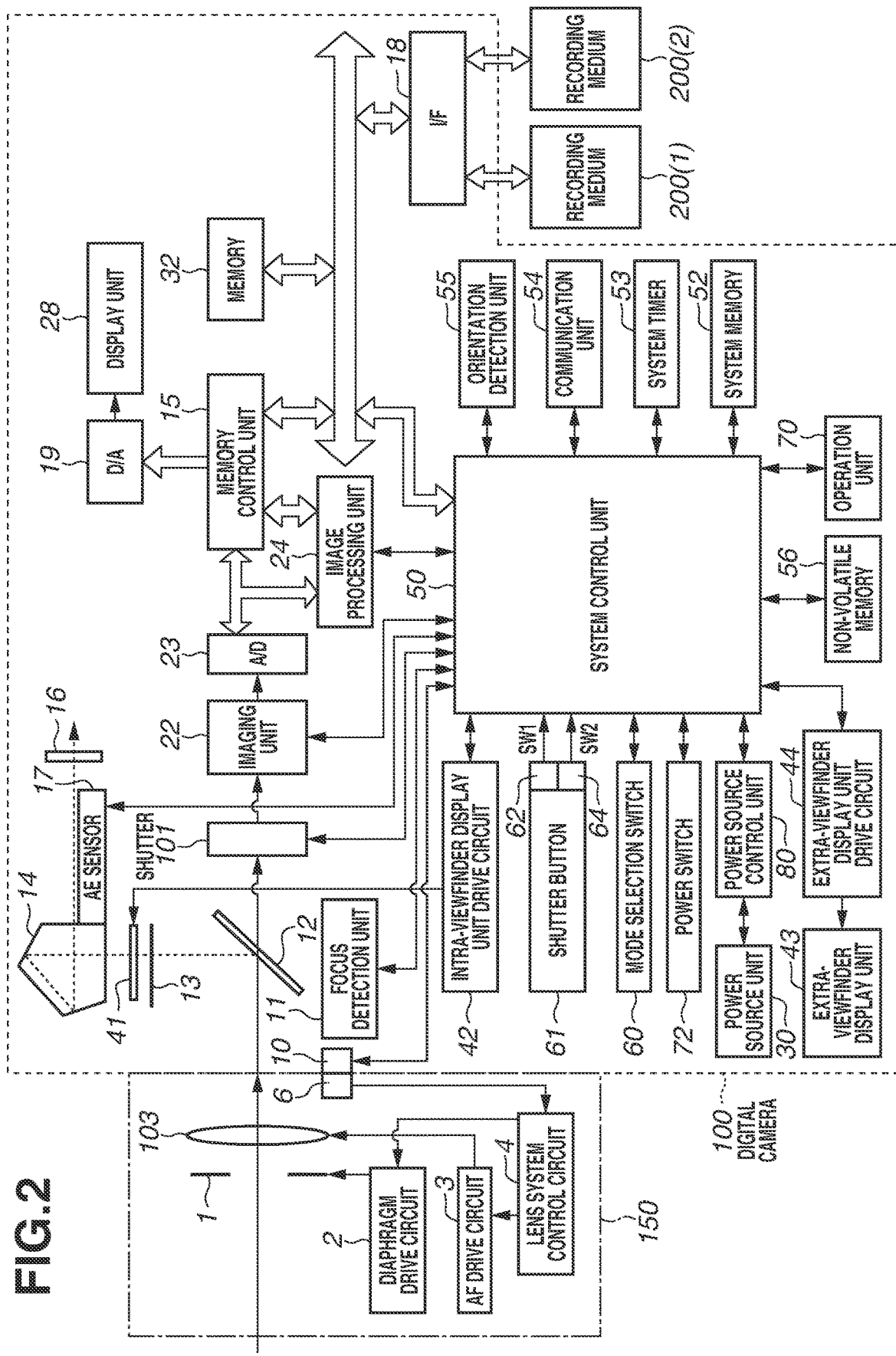

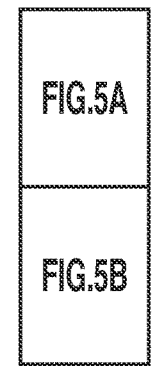
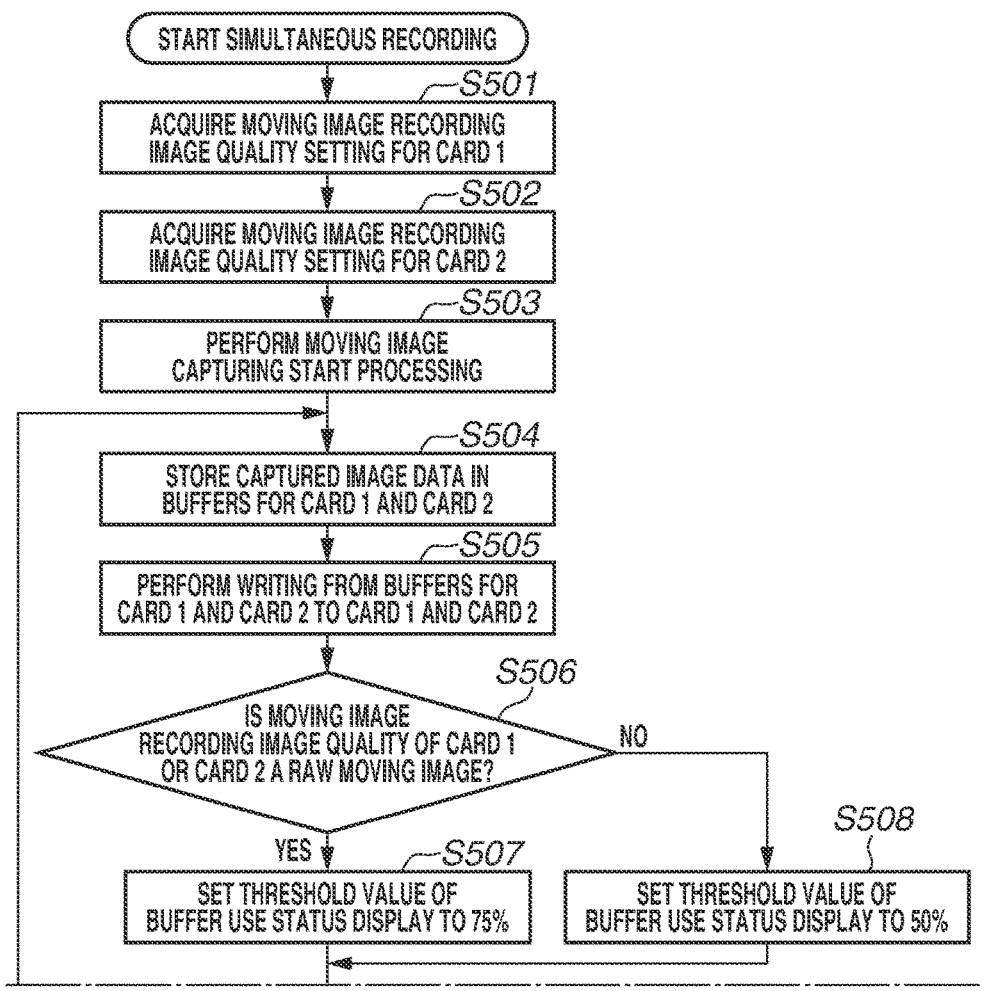
FIG.5A

IMAGING APPARATUS AND DISPLAY CONTROL METHOD

BACKGROUND OF THE INVENTION

Field of the Invention

Aspects of the present disclosure generally relate to an imaging apparatus and a display control method each of which is capable of displaying a use status of a storage region.

Description of the Related Art

Generally, digital cameras are equipped with a moving image capturing function in addition to a still image capturing function. Moving image capturing is performed by storing, in a temporary storage region, moving image data recorded by an image sensor and then writing the moving image data in a recording medium such as a memory card or a hard disk. However, since, in recent years, the recording image quality in moving image capturing has also improved, a digital camera may perform such an operation as to hinder smooth moving image capturing, for example, to urgently stop moving image capturing at timing unintended by the user as the temporary storage region is filled up with moving image data. Japanese Patent Application Laid-Open No. 2006-325148 discusses a method of notifying the user of the progress of an operation leading to urgent stopping due to a temporary storage region being filled up with moving image data by notifying the user of the used amount of the temporary storage region.

Such conventional art makes mention of a method of notifying the user of the used amount of the temporary storage region with respect to a single recording medium. However, such conventional art makes no mention of a method of notifying the user of the used amount of the temporary storage region in the case of simultaneously writing image data in a plurality of recording media.

Such conventional art also has an issue that displaying the used amounts of a plurality of temporary storage regions in the case of writing image data in a plurality of recording media may hinder displaying of image data.

Additionally, such conventional art has an issue that, in the case of being notified of a plurality of used amounts of temporary storage regions, the user may be required to, while comparing the respective used amounts with each other, recognize the progress of an operation leading to urgent stopping of image capturing due to the used amounts of temporary storage regions becoming full.

SUMMARY OF THE INVENTION

Aspects of the present disclosure are generally directed to displaying, in an easily recognizable manner, use statuses of a plurality of storage regions respectively corresponding to a plurality of recording media in the case of recording image data on the plurality of recording media.

According to an aspect of the present disclosure, an imaging apparatus includes an imaging unit, a storing unit configured to, when recording pieces of image data obtained by the imaging unit on a plurality of recording media, respectively temporarily store the pieces of image data obtained by the imaging unit in a plurality of storage regions corresponding to the plurality of recording media, a recording control unit configured to perform control to respectively record the pieces of image data temporarily stored in the plurality of storage regions on the plurality of recording media corresponding to the plurality of storage regions, and a display control unit configured to perform control to display information indicating a use status of a storage region on a display unit, wherein the display control unit performs control to display information indicating the use status only with respect to one storage region out of the plurality of storage regions.

Further features of the present disclosure will become apparent from the following description of exemplary embodiments with reference to the attached drawings.

BRIEF DESCRIPTION OF THE DRAWINGS

FIG. 2 is a block diagram illustrating a configuration of the digital camera.

DESCRIPTION OF THE EMBODIMENTS

Various exemplary embodiments, features, and aspects of the disclosure will be described in detail below with reference to the drawings.

Figure 1A:
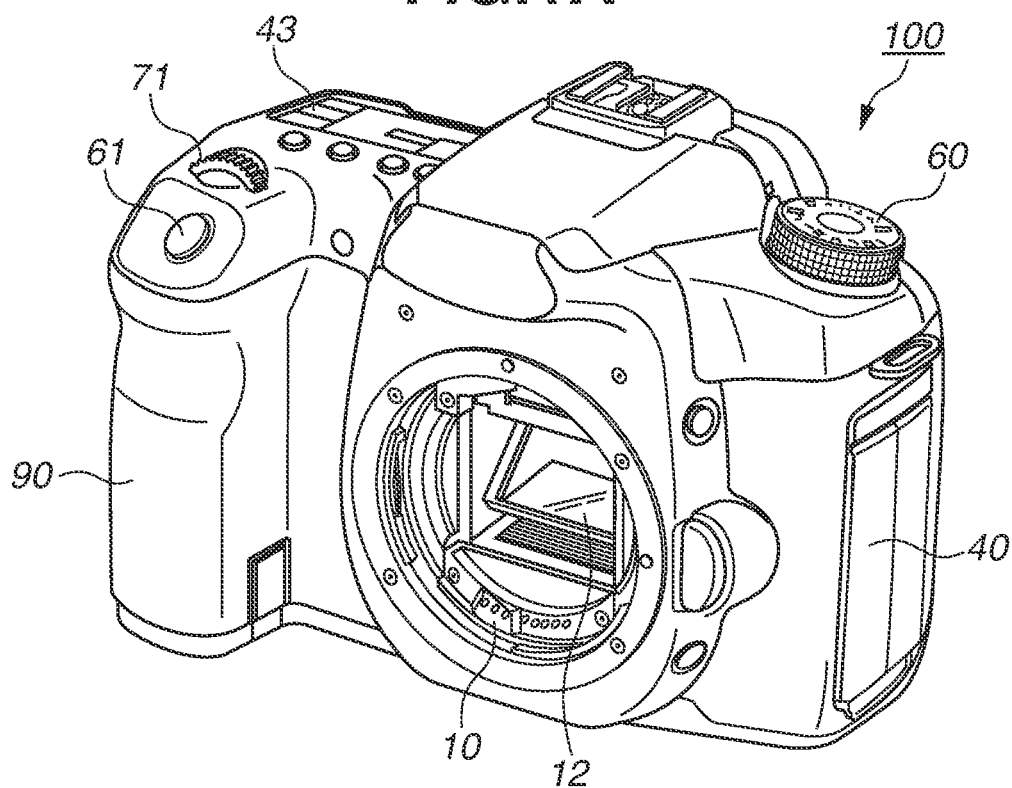
FIGS. 1A and 1B are appearance diagrams of a digital camera.
Figure 1B:
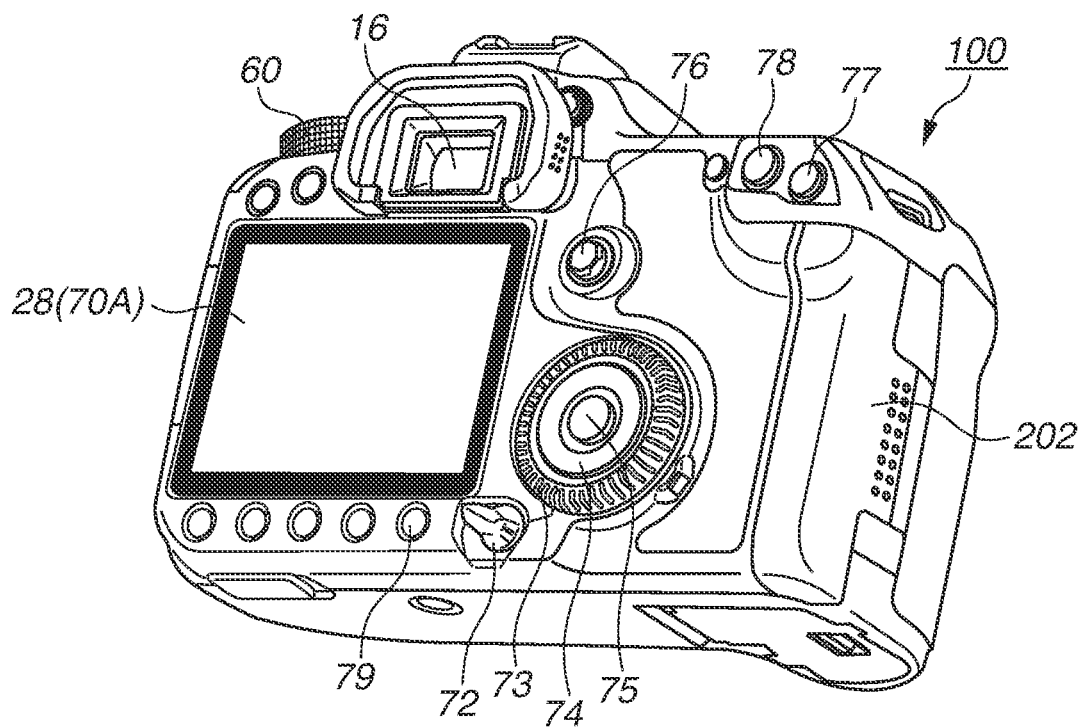

FIGS. 1A and 1B are appearance diagrams of a digital camera 100 serving as an imaging apparatus to which an exemplary embodiment of the disclosure is applicable. FIG. 1A is a front surface perspective view of the digital camera 100, and FIG. 1B is a back surface perspective view of the digital camera 100. Referring to FIGS. 1A and B, a display unit 28 is a display unit mounted on the back surface of the digital camera 100, which displays an image or various pieces of information. An extra-viewfinder display unit 43 is a display unit mounted on the top surface of the digital camera 100, on which various setting values of the digital camera 100 including, for example, a shutter speed and an aperture value are displayed. A shutter button 61 is an operation unit which is usable to issue an image capturing instruction. A mode selection switch 60 is an operation unit which is usable to switch between various modes. A terminal cover 40 is a cover which protects connectors (not illustrated) of, for example, a connection cable which connects an external device and the digital camera 100. A main electronic dial 71 is a rotational operation member included in an operation unit 70 (FIG. 2), so that the main electronic dial 71 can be rotated by the user to perform, for example, changing of setting values such as a shutter speed and an aperture value. A power switch 72 is an operation member which is usable to switch between turning-on and turning-off of the power source of the digital camera 100. A sub-electronic dial 73 is a rotational operation member included in the operation unit 70, which is usable to perform, for example, movement of a selection frame or image advance. Arrow keys 74, which are included in the operation unit 70, are arrow keys (four-way keys) in which upper, lower, left, and right arrow portions thereof are able to be pressed. An operation corresponding to a pressed arrow portion of the arrow keys 74 is able to be performed. A SET button 75 is a push button included in the operation unit 70, which is mainly used to, for example, determine a selection item. An LV button 76, which is included in the operation unit 70, is used to switch between turning-on and turning-off of live view (hereinafter referred to as "LV") in a menu button. In a moving image capturing mode, the LV button 76 is used to issue instructions for starting and stopping of moving image capturing (recording). An enlargement button 77, which is included in the operation unit 70, is an operation button used to switch between turning-on and turning-off of an enlargement mode in live view displaying of the image capturing mode and change the enlargement ratio during the enlargement mode. In the playback mode, the enlargement button 77 functions as an enlargement button used to enlarge a playback image and increase the enlargement ratio. A reduction button 78, which is included in the operation unit 70, is a button used to decrease the enlargement ratio of the enlarged playback image and reduce a displayed image. A playback button 79, which is included in the operation unit 70, is an operation button used to switch the image capturing mode and the playback mode. When the playback button 79 is pressed during the image capturing mode, the digital camera 100 transitions to the playback mode, thus causing the display unit 28 to display the latest image out of images recorded on a recording medium 200 (FIG. 2). A quick-return mirror 12 is configured to be moved up and down by an actuator (not illustrated) in response to an instruction from a system control unit 50 (FIG. 2). A communication terminal group 10 is a communication terminal group via which the digital camera 100 performs communication with a lens unit 150 (FIG. 2)(attachable to and detachable from the digital camera 100). An eyepiece viewfinder 16 is a looking-into-type viewfinder which enables the user to observe a focusing screen 13 (FIG. 2) to confirm focusing and composition of an optical image of a subject obtained through the lens unit 150. A lid 202 is the lid of a slot which contains a recording medium 200, and the digital camera 100 in the present exemplary embodiment is able to contain a plurality of recording media 200 and, therefore, includes a plurality of slots. The digital camera 100 in the present exemplary embodiment includes two slots, i.e., a slot 1 for a memory card 1 and a slot 2 for a memory card 2, and is thus able to contain two recording media 200 (1) and (2), but can be configured to contain not two but three or more recording media. A grip portion 90 is a holding portion configured to be in a shape able to be easily gripped by the right hand of the user when the user holds the digital camera 100.

FIG. 2 is a block diagram illustrating a configuration example of the digital camera 100 according to the present exemplary embodiment. In FIG. 2, the lens unit 150 is a lens unit in which an interchangeable image capturing lens is mounted. A lens 103 is usually composed of a plurality of lens elements, but, in FIG. 2, is illustrated simply as a single lens element. A communication terminal 6 is a communication terminal used for the lens unit 150 to perform communication with the digital camera 100, and a communication terminal 10 is a communication terminal used for the digital camera 100 to perform communication with the lens unit 150. The lens unit 150 performs communication with the system control unit 50 via the communication terminals 6 and 10, and causes a lens system control circuit 4, which is included in the lens unit 150, to perform control of a diaphragm 1 via a diaphragm drive circuit 2 and vary the position of the lens 103 via an autofocus (AF) drive circuit 3, thus adjusting focus.

An automatic exposure (AE) sensor 17 is configured to measure the luminance of light coming from a subject through the lens unit 150.

A focus detection unit 11 outputs defocus amount information to the system control unit 50. The system control unit 50 controls the lens unit 150 based on the defocus amount information, thus performing phase-difference AF.

The quick-return mirror 12 (hereinafter referred to as a "mirror 12") is moved up and down by an actuator (not illustrated) in response to an instruction issued from the system control unit 50 during exposure, live view image capturing, and moving image capturing. The mirror 12 is a mirror configured to switch a light flux incident from the lens 103 between advancing toward the viewfinder 16 and advancing toward the imaging unit 22. While, during a normal time, the mirror 12 is located in such a way as to reflect and guide the light flux to the viewfinder 16, during an image capturing operation and during live view display, the mirror 12 turns up and withdraws from the light flux (comes into a mirror-up state) in such a way as to guide the light flux to the imaging unit 22. Moreover, the mirror 12 is configured to be a half-reflection mirror in such a manner that a central portion thereof allows a part of the light flux to pass therethrough, thus allowing a part of the light flux to pass therethrough and fall on the focus detection unit 11, which is configured to perform focus detection.

The user can observe the focusing screen 13 via a pentagonal prism 14 and the viewfinder 16 to confirm focusing and composition of an optical image of a subject formed through the lens unit 150.

A shutter 101 is a focal plane shutter configured to freely control the exposure time of the imaging unit 22 under the control of the system control unit 50.

The imaging unit 22 is an image sensor configured with, for example, a charge-coupled device (CCD) element or a complementary metal-oxide semiconductor (CMOS) element, which converts an optical image into an electrical signal. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as reduction, and color conversion processing on the data output from the A/D converter 23 or data read out from a memory control unit 15. Moreover, the image processing unit 24 performs predetermined calculation processing using the captured image data. The system control unit 50 performs exposure control and distance measurement control based on a calculation result obtained by the image processing unit 24. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

Data output from the A/D converter 23 is then written in a memory 32 via the image processing unit 24 and the memory control unit 15 or directly via the memory control unit 15 without via the image processing unit 24. The memory 32 stores image data acquired by the imaging unit 22 and converted into digital data by the A/D converter 23 or image data that is to be displayed on the display unit 28. The memory 32 has a storage capacity sufficient to store a predetermined number of still images or a moving image and sound taken for a predetermined time. Furthermore, the memory 32 is also used as a buffer for the recording medium 200 (1) (a buffer for a card 1) and a buffer for the recording medium 200 (2) (a buffer for a card 2). The buffer for the card 1 and the buffer for the card 2 are storage regions having the same size. While, in the present exemplary embodiment, different regions included in the same memory 32 are used as the buffer for the card 1 and the buffer for the card 2, two different memories can be respectively used as the buffer for the card 1 and the buffer for the card 2.

Moreover, the memory 32 also serves as a memory for image display (video memory). A digital-to-analog (D/A) converter 19 converts data for image display stored in the memory 32 into an analog signal and supplies the analog signal to the display unit 28. In this way, image data for display stored in the memory 32 is then displayed on the display unit 28 via the D/A converter 19. The display unit 28 performs display corresponding to the analog signal supplied from the D/A converter 19 on a display device, such as a liquid crystal display (LCD). A digital signal obtained by A/D conversion performed once by the A/D converter 23 and stored in the memory 32 is then converted into an analog signal by the D/A converter 19, and the analog signal is then sequentially transferred to the display unit 28 and displayed thereon, so that the function of an electronic viewfinder is implemented, thus enabling performing through-image display (live view display (LV display)). Hereinafter, an image which is displayed in live view is referred to as an "LV image".

An intra-viewfinder liquid crystal display unit 41 is configured to display, for example, a frame (AF frame) indicating a distance measuring point or points on which automatic focusing is currently being performed and an icon representing the setting status of the digital camera 100 via an intra-viewfinder display unit drive circuit 42.

The extra-viewfinder liquid crystal display unit 43 is configured to display various setting values of the digital camera 100 including, for example, a shutter speed and an aperture value via an extra-viewfinder display unit drive circuit 44.

A non-volatile memory 56 is an electrically erasable and recordable memory, for which, for example, an electrically erasable programmable read-only memory (EEPROM) is used. For example, constants, various setting values, and a program for operations of the system control unit 50 are stored in the non-volatile memory 56. The program as used here is a computer program which is executed to implement various flowcharts described below in the present exemplary embodiment.

The system control unit 50 is a control unit composed of at least one processor or circuit, and controls the entire digital camera 100. The system control unit 50 implements various processing operations in the present exemplary embodiment and processing operations in the flowcharts of FIGS. 3, 4, and 5 by executing the above-mentioned program recorded on the non-volatile memory 56. A system memory 52 includes, for example, a random access memory (RAM), on which, for example, constants and variables for operations of the system control unit 50 and a program read out from the non-volatile memory 56 are loaded. Moreover, the system control unit 50 also performs display control by controlling, for example, the memory 32, the D/A converter 19, and the display unit 28. The system control unit 50 also performs control of generation of image data, control of accumulation (temporary storage) of image data in the memory 32 (buffer), and recording control of image data on the recording medium 200 by controlling, for example, the image processing unit 24, the memory 32, the memory control unit 15, and a recording medium interface (I/F) 18.

A system timer 53 is a timer unit which measures times for use in various control operations and time in a built-in clock.

A mode selection switch 60, a first shutter switch 62, a second shutter switch 64, and an operation unit 70 are operation units used to input various operation instructions to the system control unit 50. The mode selection switch 60 switches an operation mode of the system control unit 50 to any one of, for example, a still image recording mode, a moving image capturing mode, and a playback mode. Modes included in the still image recording mode include an automatic image capturing mode, an automatic scene discrimination mode, a manual mode, an aperture priority mode (Av mode), a shutter speed priority mode (Tv mode), and a program automatic exposure (AE) mode. Moreover, the modes included in the still image recording mode further include various scene modes in which image capturing settings for the respective image capturing scenes are performed and a custom mode. The mode selection switch 60 is used to directly switch the operation mode of the system control unit 50 to any one of these modes. Alternatively, after switching to a list screen for image capturing modes is once performed by the mode selection switch 60, another operation member can be used to perform switching to any one of a plurality of image capturing modes displayed in the list screen. Likewise, a plurality of modes can be included in the moving image capturing mode.

The first shutter switch 62 is configured to be turned on in response to a halfway operation, in other words, a half-pressed state, of the shutter button 61 of the digital camera 100 (an image capturing preparation instruction), thus generating a first shutter switch signal SW1. In response to the first shutter switch signal SW1, operations, such as autofocus (AF) processing, automatic exposure (AE) processing, automatic white balance (AWB) processing, and flash preliminary emission (EF) processing, are started.

The second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a signal readout operation from the imaging unit 22 and leading to a writing operation for data to the recording medium 200.

Various operation members of the operation unit 70 are assigned the respective functions for each situation as appropriate with various function icons displayed on the display unit 28 being selected and operated, and thus act as various function buttons. The function buttons include, for example, an end button, a back button, an image forwarding button, a jump button, a stop-down button, and an attribute changing button. For example, when a menu button is pressed, various settable menu screens are displayed on the display unit 28. The user is allowed to intuitively perform various settings with use of a menu screen displayed on the display unit 28 and 4-way up, down, left, and right buttons and the SET button.

The operation unit 70 includes various operation members serving as an input portion which receives an operation performed by the user. Specifically, the operation unit 70 includes, for example, a press button, a rotary dial, and a touch sensor and further includes at least the shutter button 61, the main electronic dial 71, the power switch 72, the sub-electronic dial 73, the arrow keys 74, the SET button 75, the LV button 76, the enlargement button 77, the reduction button 78, and the playback button 79.

A power source control unit 80 is configured with, for example, a battery detection circuit, a DC-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, and supplies required voltages to various portions, including the recording medium 200, for respective required periods. A power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

The recording medium interface (I/F) 18 is an interface with the recording medium 200, such as a memory card or a hard disk. The recording medium 200 is a recording medium, such as a memory card, which is used to record an image at the time of image capturing, and is configured with, for example, a semiconductor memory or a magnetic disc. In the present exemplary embodiment, the recording medium 200 is a memory card, and, in the case of the digital camera 100 according to the present exemplary embodiment, a recording medium 200 (1) and a recording medium 200 (2) are connected to the digital camera 100 in a detachable manner. The digital camera 100 can be configured to be able to be connected to two or more recording media. Then, the digital camera 100 has a single recording mode which records captured image data on only one of the recording medium 200 (1) and the recording medium 200 (2) and a simultaneous recording mode which simultaneously records captured image data on both the recording medium 200 (1) and the recording medium 200 (2). Then, the single recording mode and the simultaneous recording mode are able to be switched to each other by a user operation performed in, for example, menu setting. In the following description, the recording medium 200 (1) is referred to as a "card 1" and the recording medium 200 (2) is referred to as a "card 2". Moreover, the recording medium 200 (1) and the recording medium 200 (2) can be memory cards of the same type, or can be memory cards of different types. A communication unit 54 connects to an external device or a network via wireless or via a wired cable, and performs transmission and reception of, for example, a video signal and an audio signal. The communication unit 54 is also able to connect to a wireless local area network (LAN) or the Internet. The communication unit 54 is able to transmit an image (including an LV image) captured by the imaging unit 22 and an image recorded on the recording medium 200, and is also able to receive an image or various other pieces of information from an external device.

An orientation detection unit 55 detects the orientation of the digital camera 100 with respect to the direction of gravitational force. Whether an image captured by the imaging unit 22 is an image captured with the digital camera 100 held in a landscape orientation or an image captured with the digital camera 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor. The acceleration sensor or gyroscope sensor serving as the orientation detection unit 55 is able to be used to detect motions of the digital camera 100 (for example, panning, tilting, lifting, and remaining still or not).

One of members of the operation unit 70 is a touch panel 70a (FIG. 1B) which is capable of detecting contact with the display unit 28. The touch panel 70a and the display unit 28 can be configured in an integrated manner. For example, the touch panel 70a is configured to have such a light transmittance as not to hinder displaying performed by the display unit 28, and is attached to the upper layer of a display surface of the display unit 28. Then, the input coordinates in the touch panel 70a are associated with the display coordinates on a display screen of the display unit 28. With this, a graphical user interface (GUI) can be configured as if the user is allowed to directly operate a screen displayed on the display unit 28. The system control unit 50 is able to detect the following operations performed on the touch panel 70a or states thereof:

the state in which a finger or pen, which has not been touching the touch panel 70a, has newly touched the touch panel 70a, in other words, starting of a touch (hereinafter referred to as "touch-down");

the state in which a finger or pen is touching the touch panel 70a (hereinafter referred to as "touch-on");

the state in which a finger or pen is moving while touching the touch panel 70a (hereinafter referred to as "touch-move");

the state in which a finger or pen, which has been touching the touch panel 70a, has been separated from the touch panel 70a, in other words, ending of a touch (hereinafter referred to as "touch-up"); and the state in which none is touching the touch panel 70a (hereinafter referred to as "touch-off").

When touch-down is detected, touch-on is also detected at the same time. After touch-down, unless touch-up is detected, touch-on normally continues being detected. Touch-move is also detected in the state in which touch-on is detected. Even if touch-on is detected, unless the touch position is not moving, touch-move is not detected. After touch-up of all of the fingers or pen touching the touch panel 70a is detected, touch-off is detected.

Information on these operations or states and the coordinates of a position at which a finger or pen is touching the touch panel 70a is communicated to the system control unit 50 via an internal bus, and then, the system control unit 50 determines how an operation (touch operation) has been performed on the touch panel 70a based on the communicated information. With regard to touch-move, the system control unit 50 is able to also detect the direction of movement of a finger or pen moving on the touch panel 70a for each of a vertical component and a horizontal component on the touch panel 70a based on a change of the position coordinates. When it is detected that touch-move has been performed a predetermined distance or more, the system control unit 50 is assumed to determine that a slide operation has been performed. An operation of quickly moving the finger a certain degree of distance while keeping the finger touching the touch panel 70a and then directly separating the finger from the touch panel 70a is referred to as "flick". In other words, the flick is an operation of quickly tracing the surface of the touch panel 70a as if flicking the touch panel 70a with the finger. When touch-move performed a predetermined distance or more at a predetermined speed or higher is detected and touch-up is then detected, the system control unit 50 determines that flick has been performed (determines that flick has been performed subsequent to a slide operation).

Additionally, a touch operation of concurrently touching a plurality of positions (for example, two points) and then moving the touch positions closer to each other is referred to as "pinch-in", and a touch operation of moving the touch positions away from each other is referred to as "pinch-out". Pinch-out and pinch-in are collectively referred to as a "pinch operation" (or simply as "pinch").

The touch panel 70a can be any type of touch panel selected from among touch panels of various types including, for example, the resistance film type, the capacitance type, the surface acoustic wave type, the infrared ray type, the electromagnetic induction type, the image recognition type, and the optical sensor type. Among these types, there are a type which detects that touch has been performed based on contact with the touch panel and a type which detects that touch has been performed based on access of a finger or pen to the touch panel, but any one of the two types can be employed.

Moreover, the present exemplary embodiment is applicable to not only an imaging apparatus body but also a control apparatus which communicates with an imaging apparatus (including a network camera) via wired or wireless communication and remotely controls the imaging apparatus. Examples of the control apparatus which remotely controls an imaging apparatus include a smartphone, a tablet personal computer (PC), and a desktop PC. Such a control apparatus is able to remotely control the imaging apparatus by communicating, from the control apparatus, a command for causing the imaging apparatus to perform various operations and settings based on an operation performed on the control apparatus or a processing operation performed by the control apparatus. Moreover, the control apparatus can be configured to be able to receive a live view image captured by the imaging apparatus via wired or wireless communication and display the received live view image.

Figure 3:
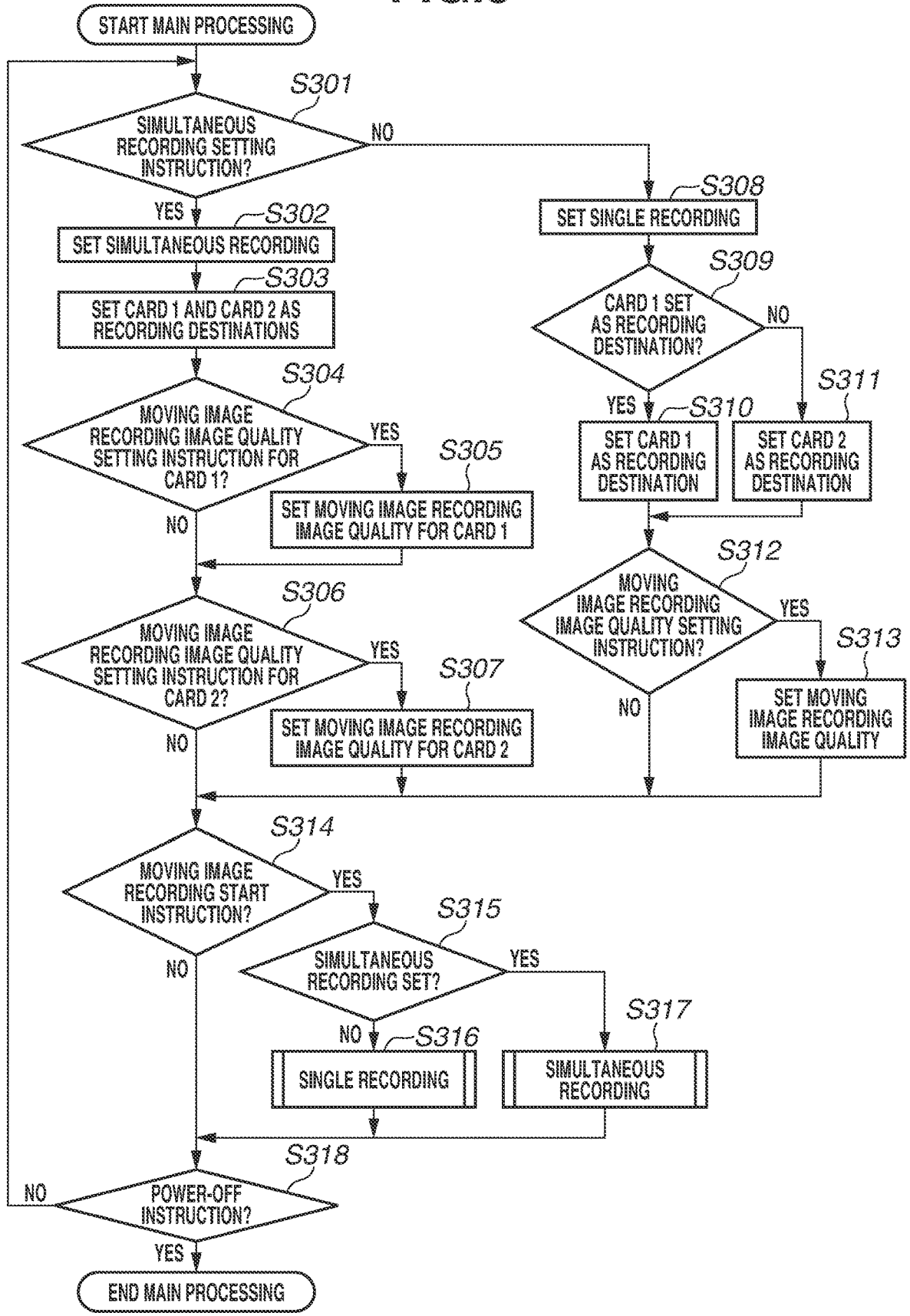
FIG. 3 is a flowchart illustrating main processing in the digital camera.

FIG. 3 is a flowchart of main processing which is performed by the digital camera 100 according to the present exemplary embodiment when the digital camera 100 is powered on in a moving image recording mode. Respective processing operations are implemented by, at the time of turning-on of the power switch 72, the system control unit 50 loading a program stored in the non-volatile memory 56 onto the system memory 52 and executing the program.

In step S301, the system control unit 50 determines whether a simultaneous recording setting instruction has been issued by the user operating the operation unit 70. If it is determined that the simultaneous recording setting instruction has been issued (YES in step S301), the system control unit 50 advances the processing to step S302, and, if it is determined that the simultaneous recording setting instruction has not been issued (NO in step S301), the system control unit 50 advances the processing to step S308.

In step S302, the system control unit 50 stores simultaneous recording setting in the non-volatile memory 56.

In step S303, since simultaneous recording setting (simultaneous recording mode), which simultaneously records image data on both the card 1 and the card 2, has been set, the system control unit 50 sets the card 1 and the card 2 as recording destinations, and stores such setting in the non-volatile memory 56.

In step S304, the system control unit 50 determines whether a recording image quality setting instruction for a moving image to be recorded on the card 1 has been issued. If it is determined that the recording image quality setting instruction for a moving image to be recorded on the card 1 has been issued (YES in step S304), the system control unit 50 advances the processing to step S305, and, if it is determined that the recording image quality setting instruction has not been issued (NO in step S304), the system control unit 50 advances the processing to step S306.

In step S305, the system control unit 50 stores recording image quality setting for a moving image to be recorded on the card 1 in the non-volatile memory 56.

In step S306, the system control unit 50 determines whether a recording image quality setting instruction for a moving image to be recorded on the card 2 has been issued. If it is determined that the recording image quality setting instruction for a moving image to be recorded on the card 2 has been issued (YES in step S306), the system control unit 50 advances the processing to step S307, and, if it is determined that the recording image quality setting instruction has not been issued (NO in step S306), the system control unit 50 advances the processing to step S314.

In step S307, the system control unit 50 stores recording image quality setting for a moving image to be recorded on the card 2 in the non-volatile memory 56.

In this way, in the case of simultaneous recording setting, it is possible to set respective image qualities of image data to be recorded on the card 1 and the card 2, thus enabling recording image data with different image qualities for respective cards. For example, it is possible to perform setting for the card 1 in such a way as to record raw image data, which has not been subjected to development processing and has a high image quality, as a raw file on the card 1 and to perform setting for the card 2 in such a way as to record developed image data, which has been subjected to development processing and has thus been compressed in H.265 (High Efficiency Video Coding (HEVC)) format, as an MP4 file on the card 2.

In step S308, the system control unit 50 stores single recording setting in the non-volatile memory 56.

If single recording setting (single recording mode), which records image data on only one of the card 1 and the card 2, is set, it is necessary to set any one of the card 1 and the card 2 as a recording destination. Therefore, in step S309, the system control unit 50 determines whether an instruction for setting the card 1 as a recording destination has been issued. If it is determined that an instruction for setting the card 1 as a recording destination has been issued (YES in step S309), the system control unit 50 advances the processing to step S310, and, if it is determined that such an instruction has not been issued (NO in step S309), the system control unit 50 advances the processing to step S311.

In step S310, the system control unit 50 sets the card 1 as a recording destination and stores such setting in the non-volatile memory 56.

In step S311, the system control unit 50 sets the card 2 as a recording destination and stores such setting in the non-volatile memory 56.

In step S312, the system control unit 50 determines whether a moving image recording image quality setting instruction has been issued. If it is determined that the moving image recording image quality setting instruction has been issued (YES in step S312), the system control unit 50 advances the processing to step S313, and, if it is determined that the moving image recording image quality setting instruction has not been issued (NO in step S312), the system control unit 50 advances the processing to step S314.

Furthermore, at this time, regardless of which of the card 1 and the card 2 the moving image recording image quality setting instruction indicates as a recording destination, the system control unit 50 can be configured to perform recording with a moving image recording image quality set for the card 1 when the recording destination setting is the card 1 at the time of starting of moving image recording and to perform recording with a moving image recording image quality set for the card 2 when the recording destination setting is the card 2.

In step S313, the system control unit 50 stores the moving image recording image quality setting in the non-volatile memory 56.

In step S314, the system control unit 50 determines whether a moving image recording start instruction has been issued by the LV button 76 being pressed. If it is determined that the moving image recording start instruction has been issued (YES in step S314), the system control unit 50 advances the processing to step S315, and, if it is determined that the moving image recording start instruction has not been issued (NO in step S314), the system control unit 50 advances the processing to step S318.

In step S315, the system control unit 50 determines whether the simultaneous recording setting is currently stored in the non-volatile memory 56. If it is determined that the simultaneous recording setting is currently stored (YES in step S315), the system control unit 50 advances the processing to step S317, and, if it is determined that the simultaneous recording setting is not stored (NO in step S315), the system control unit 50 advances the processing to step S316.

Figure 4:
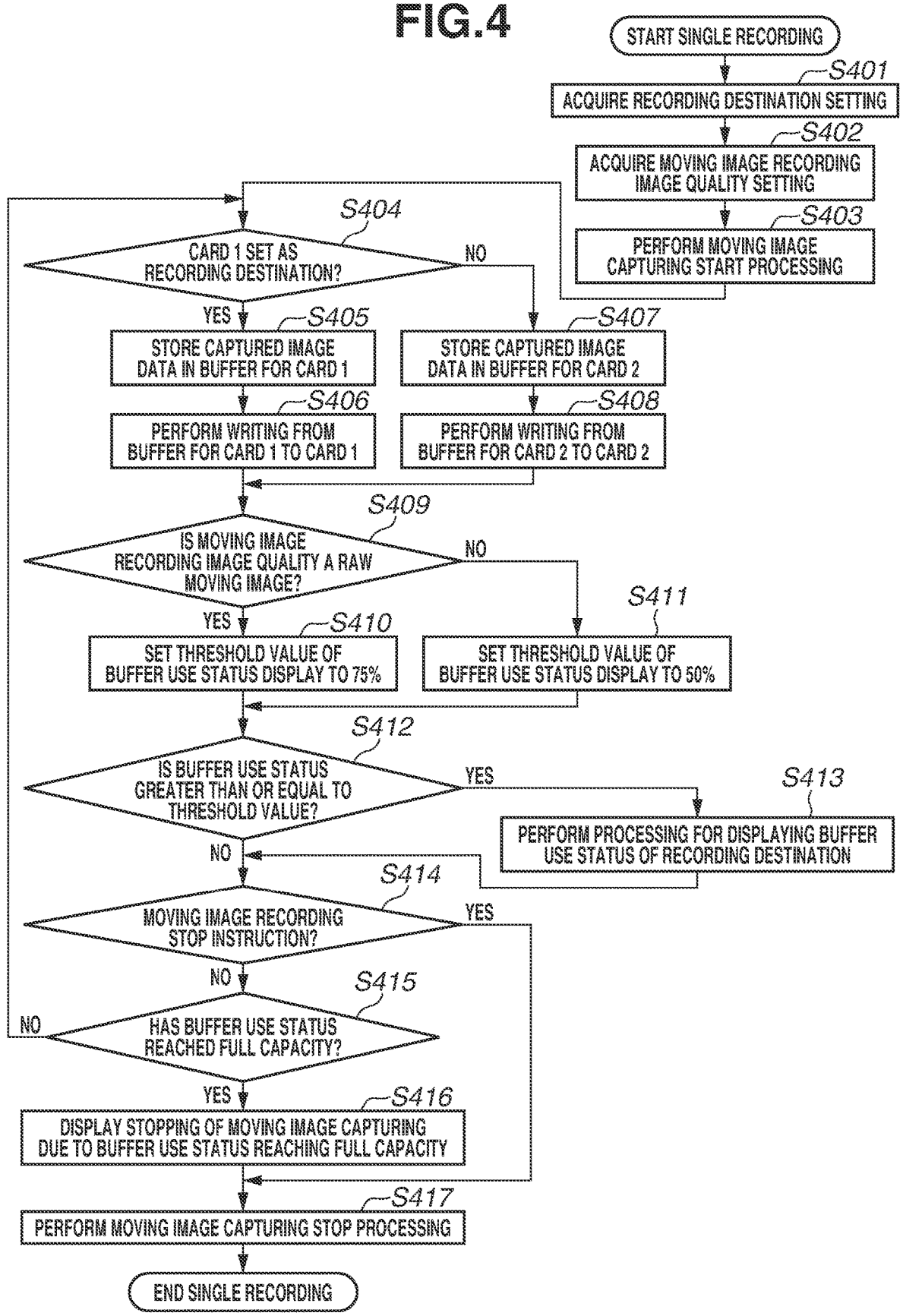
FIG. 4 is a flowchart illustrating single recording in the digital camera.

In step S316, since the moving image recording start instruction has been issued in the state of the single recording mode being set, the system control unit 50 performs single recording processing, which is described below with reference to FIG. 4.

In step S317, since the moving image recording start instruction has been issued in the state of the simultaneous recording mode being set, the system control unit 50 performs simultaneous recording processing, which is described below with reference to FIG. 5.

In step S318, the system control unit 50 determines whether the power switch 72 has been turned off. If it is determined that the power switch 72 has been turned off (YES in step S318), the system control unit 50 ends the main processing, and, if it is determined that the power switch 72 has not been turned off (NO in step S318), the system control unit 50 returns the processing to step S301.

In this way, the present exemplary embodiment is able to set a single recording mode which records image data on one of two memory cards and a simultaneous recording mode which simultaneous records image data on both of the two memory cards. Additionally, the present exemplary embodiment is able to set an image quality of image data to be recorded on a memory card, and, in the case of the simultaneous recording mode, is able to set different image qualities for respective memory cards. Furthermore, the present exemplary embodiment is able to set, as moving image recording image quality setting, whether to record a raw moving image, which has not been subjected to development processing, as a raw file or record an MP4 moving image, which has been subjected to development processing and compressed in H.265 (HEVC) format, as an MP4 file.

In the following description, an operation procedure about the single recording processing, which is performed in step S316, is described with reference to FIG. 4. FIG. 4 is a flowchart illustrating an example of processing which is performed from the time of starting of moving image capturing for the card 1 or the card 2 to the time of completion of the moving image capturing in the present exemplary embodiment. This processing is implemented by the system control unit 50 loading a program stored in the non-volatile memory 56 onto the system memory 52 and executing the program.

In step S401, the system control unit 50 acquires the recording destination setting stored in the non-volatile memory 56.

In step S402, the system control unit 50 acquires the moving image recording image quality setting stored in the non-volatile memory 56.

In step S403, the system control unit 50 performs moving image recording start processing, such as starting of signal readout from the imaging unit 22.

In step S404, the system control unit 50 determines whether the card 1 is currently set as the recording destination setting. If it is determined that the card 1 is currently set as the recording destination setting (YES in step S404), the system control unit 50 advances the processing to step S405, and, if it is determined that the card 1 is not currently set (NO in step S404), the system control unit 50 advances the processing to step S407.

In step S405, the system control unit 50 stores the captured moving image data in a buffer for the card 1.

Furthermore, the present exemplary embodiment is characterized in that, at this time, the moving image data changes in data amount according to the moving image recording image quality which is currently set.

In step S406, the system control unit 50 performs writing from the buffer for the card 1 to the card 1.

Furthermore, the present exemplary embodiment is characterized in that, at this time, the amount of moving image data which is written from the buffer for the card 1 to the card 1 changes according to the writing speed for the card 1.

In step S407, the system control unit 50 stores the captured moving image data in a buffer for the card 2.

Furthermore, the present exemplary embodiment is characterized in that, at this time, the moving image data changes in data amount according to the moving image recording image quality which is currently set.

In step S408, the system control unit 50 performs writing from the buffer for the card 2 to the card 2.

Furthermore, the present exemplary embodiment is characterized in that, at this time, the amount of moving image data which is written from the buffer for the card 2 to the card 2 changes according to the writing speed for the card 2.

In step S409, the system control unit 50 determines whether the moving image recording image quality is a raw moving image. If it is determined that the moving image recording image quality is a raw moving image (YES in step S409), the system control unit 50 advances the processing to step S410, and, if it is determined that the moving image recording image quality is not a raw moving image (NO in step S409), the system control unit 50 advances the processing to step S411.

In step S410, the system control unit 50 sets a threshold value of the buffer use status display to 75%, and stores the set threshold value in the non-volatile memory 56.

In step S411, the system control unit 50 sets a threshold value of the buffer use status display to 50%, and stores the set threshold value in the non-volatile memory 56.

In step S412, the system control unit 50 determines whether the used amount of data accumulated in the buffer is greater than or equal to the threshold value of the buffer use status display. If it is determined that the used amount of data accumulated in the buffer is greater than or equal to the threshold value of the buffer use status display (YES in step S412), the system control unit 50 advances the processing to step S413, and, if it is determined that the used amount of data accumulated in the buffer is less than the threshold value of the buffer use status display (NO in step S412), the system control unit 50 advances the processing to step S414.

In step S413, the system control unit 50 displays the buffer use status of the recording destination on the display unit 28.

Furthermore, at this time, the method of expressing the use status of the buffer is not especially limited.

Figure 6A:
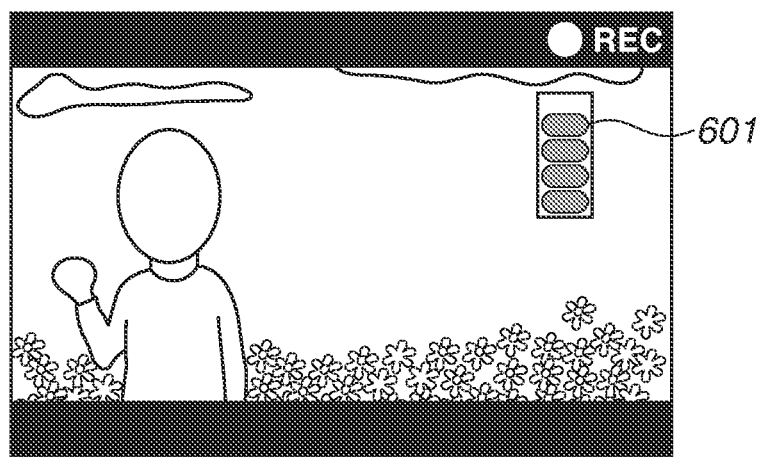
FIGS. 6A, 6B, and 6C are diagrams illustrating moving image captured screens obtained by the digital camera in an exemplary embodiment.

Moreover, in the present exemplary embodiment, an indication 601 illustrated in FIG. 6A is an example in which the buffer use status displayed on the display unit 28 is expressed in the form of a progress gauge.

In step S414, the system control unit 50 determines whether a moving image recording stop instruction has been issued by the LV button 76 being pressed. If it is determined that the moving image recording stop instruction has been issued (YES in step S414), the system control unit 50 advances the processing to step S417, and, if it is determined that the moving image recording stop instruction has not been issued (NO in step S414), the system control unit 50 advances the processing to step S415.

In step S415, the system control unit 50 determines whether the use status of the buffer has reached a full capacity. If it is determined that the use status of the buffer has reached the full capacity (YES in step S415), the system control unit 50 advances the processing to step S416, and, if it is determined that the use status of the buffer has not reached the full capacity (NO in step S415), the system control unit 50 returns the processing to step S404.

In step S416, the system control unit 50 displays, on the display unit 28, a moving image recording stop notification due to the use status of the buffer reaching a full capacity.

Figure 7A:
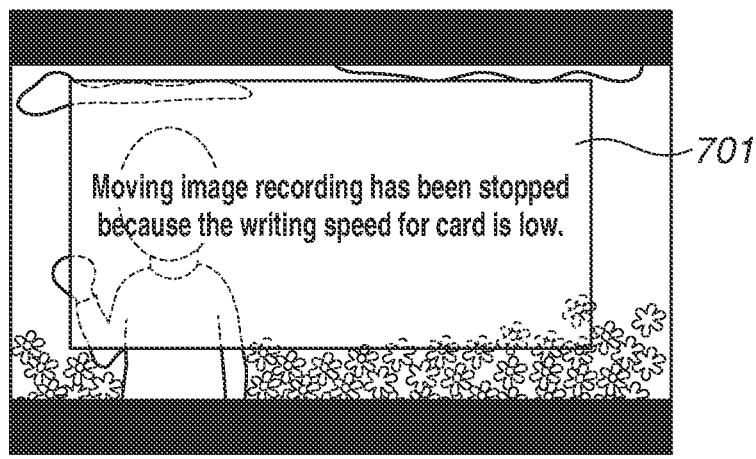
FIGS. 7A, 7B, and 7C are diagrams illustrating moving image stopped screens obtained by the digital camera in the exemplary embodiment.

Moreover, in the present exemplary embodiment, an indication 701 illustrated in FIG. 7A is an example of the moving image recording stop notification due to the use status of the buffer reaching a full capacity, which is displayed on the display unit 28.

In step S417, the system control unit 50 performs moving image recording stop processing, such as stopping of signal readout from the imaging unit 22.

Furthermore, it is assumed that, in a case where an abnormal operation, such as rotating, for example, a mode dial, has been performed during the present flow, the flow may be interrupted on the way.

Moreover, while the present flow has been described with moving image capturing taken as an example, the content of the present flow is assumed to be able to be applied to continuous image capturing for still images.

Figure 5B:
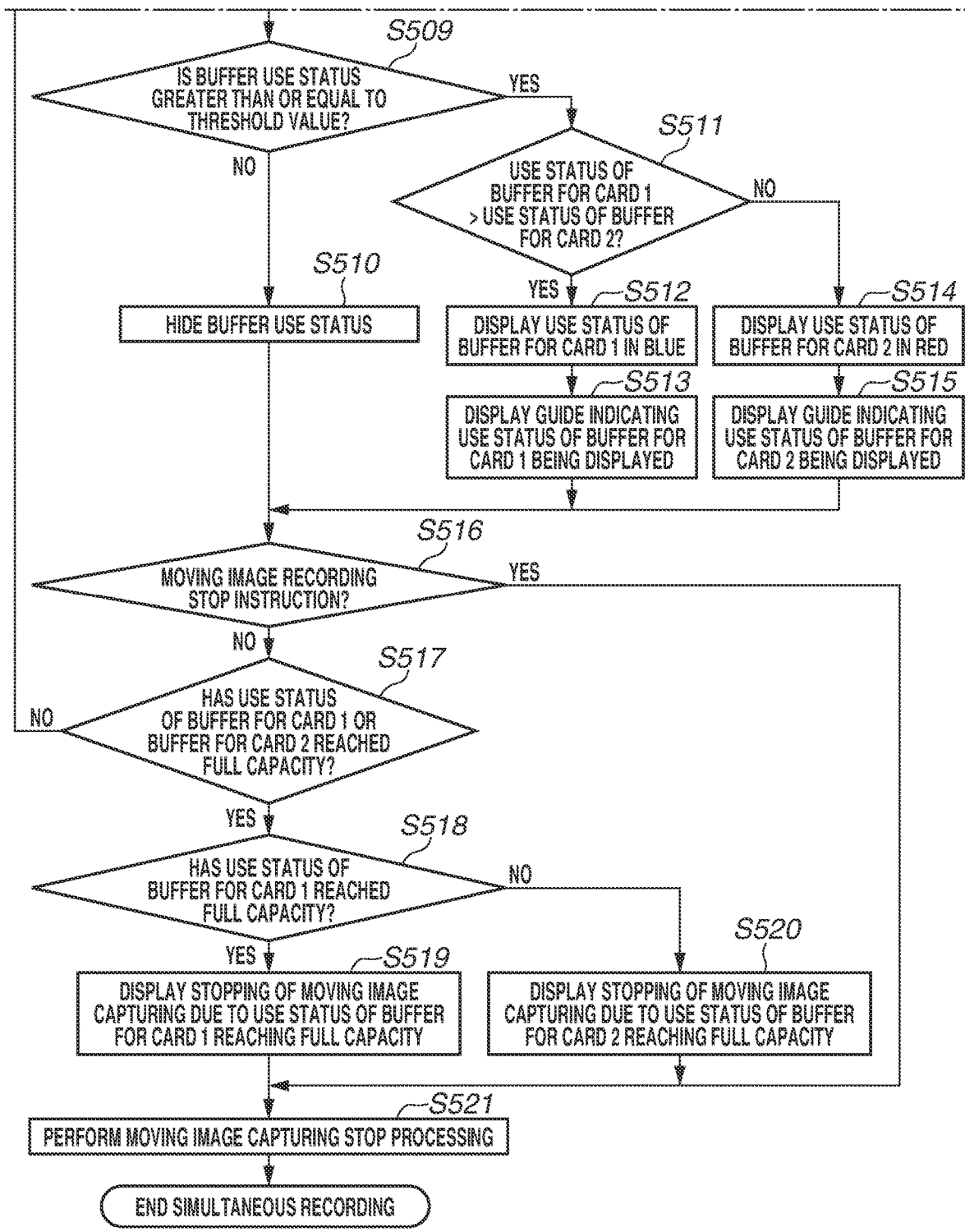
FIG. 5, which is composed of FIGS. 5A and 5B, is a flowchart illustrating simultaneous recording in the digital camera.

In the following description, an operation procedure about the simultaneous recording processing, which is performed in step S317, is described with reference to FIG. 5. FIG. 5, which is composed of FIGS. 5A and 5B, is a flowchart illustrating an example of processing which is performed from the time of starting of moving image capturing for both the card 1 and the card 2 to the time of completion of the moving image capturing in the present exemplary embodiment. This processing is implemented by the system control unit 50 loading a program stored in the non-volatile memory 56 onto the system memory 52 and executing the program.

In step S501, the system control unit 50 acquires the moving image recording image quality setting for the card 1 stored in the non-volatile memory 56.

In step S502, the system control unit 50 acquires the moving image recording image quality setting for the card 2 stored in the non-volatile memory 56.

In step S503, the system control unit 50 performs moving image recording start processing, such as starting of signal readout from the imaging unit 22.

In step S504, the system control unit 50 temporarily stores moving image data captured by the imaging unit 22 in the buffers for the card 1 and for the card 2. At this time, the system control unit 50 applies, to the moving image data captured by the imaging unit 22, processing performed by the image processing unit 24 according to the moving image recording image quality setting for the card 1 acquired in step S501, thus generating moving image data for the card 1, and accumulates and temporarily stores the generated moving image data in the buffer for the card 1. Then, the system control unit 50 applies, to the same moving image data captured by the imaging unit 22, processing performed by the image processing unit 24 according to the moving image recording image quality setting for the card 2 acquired in step S502, thus generating moving image data for the card 2, and accumulates and temporarily stores the generated moving image data in the buffer for the card 2. Therefore, pieces of moving image data temporarily stored in the respective buffers differ in data amount according to the moving image recording image qualities which are currently set.

In step S505, the system control unit 50 writes the moving image data temporarily stored in the buffer for the card 1 to the card 1 and writes the moving image data temporarily stored in the buffer for the card 2 to the card 2. Furthermore, at this time, the amount of moving image data which is written from the buffer to the card differs according to the writing speeds for the card 1 and the card 2.

In step S506, the system control unit 50 determines whether the moving image recording image quality for the card 1 or the moving image recording image quality for the card 2 is a raw moving image. If it is determined that the moving image recording image quality for the card 1 or the moving image recording image quality for the card 2 is a raw moving image (YES in step S506), the system control unit 50 advances the processing to step S507, and, if it is determined that neither of the moving image recording image qualities for the card 1 and the card 2 is a raw moving image (NO in step S506), the system control unit 50 advances the processing to step S508.

In step S507, the system control unit 50 sets a threshold value of the buffer use status display to 75%, and stores the set threshold value in the non-volatile memory 56.

In step S508, the system control unit 50 sets a threshold value of the buffer use status display to 50%, and stores the set threshold value in the non-volatile memory 56.

While, in the present exemplary embodiment, the threshold value is set according to the set moving image recording image quality, the threshold value can be configured to be set without depending on the moving image recording image quality. Furthermore, in the case of a raw moving image, a larger value than that in the case of not being a raw moving image is set as the threshold value. In other words, in the case of a raw moving image, unless the used amount of the buffer becomes larger than that in the case of not being a raw moving image, the buffer use status is not displayed.

In step S509, the system control unit 50 determines whether the use status of the buffer for the card 1 or for the card 2 has become greater than or equal to the threshold value. Specifically, the system control unit 50 determines whether the buffer used amount of the buffer for the card 1 or for the card 2 is greater than or equal to the threshold value of the buffer use status display set in step S507 or S508 and stored in the non-volatile memory 56. If it is determined that the buffer used amount of at least one of the buffer for the card 1 and the buffer for the card 2 is greater than or equal to the threshold value of the buffer use status display (YES in step S509), the system control unit 50 advances the processing to step S511. If it is determined that both the buffer used amount of the buffer for the card 1 and the buffer used amount of the buffer for the card 2 are less than the threshold value (NO in step S509), the system control unit 50 advances the processing to step S510. In the present exemplary embodiment, the system control unit 50 is configured to determine whether the used amount of the buffer relative to the size of the entire buffer, in other words, the usage rate of the buffer, is greater than or equal to the threshold value set in step S507 or S508 and stored in the non-volatile memory 56. Here, the used amount of the buffer refers to the size (data amount) of moving image data temporarily stored in the buffer but not yet recorded on a recording medium. However, the system control unit 50 can perform the above determination with use of not the usage rate of the buffer but the used amount of the buffer or the number of image frames accumulated in the buffer but not yet recorded on the card, as the use status of the buffer. In that case, the threshold value is also replaced by a value corresponding to such an amount or number. In the present exemplary embodiment, since the buffer for the card 1 and the buffer for the card 2 are the same in size, the used amount of the buffer and the usage rate of the buffer become equivalent to each other. In step S510, the system control unit 50 hides the buffer use status.

In step S511, the system control unit 50 compares the use status of the buffer for the card 1 and the use status of the buffer for the card 2 with each other. In the present exemplary embodiment, the system control unit 50 compares the used amount of the buffer for the card 1 and the used amount of the buffer for the card 2 with each other, and, if it is determined that the used amount of the buffer for the card 1 is greater than the used amount of the buffer for the card 2 (YES in step S511), the system control unit 50 advances the processing to step S512. If it is determined that the used amount of the buffer for the card 2 is greater than or equal to the used amount of the buffer for the card 1 (NO in step S511), the system control unit 50 advances the processing to step S514. The system control unit 50 can be configured to determine not the used amount of the buffer but the usage rate thereof or the number of image frames accumulated in the buffer but not yet recorded on the card, and, if it is determined that the buffer for the card 1 is greater than the buffer for the card 2 in such a rate or number, the system control unit 50 can advance the processing to step S512 and, if it is determined that the buffer for the card 2 is greater than or equal to the buffer for the card 1 in such a rate or number, the system control unit 50 can advance the processing to step S514.

In a case where the use status of the buffer for the card 1 is greater than the use status of the buffer for the card 2, then in step S512, the system control unit 50 displays, as the use status of the buffer for the card 1, the used amount of the buffer for the card 1 in blue on the display unit 28. In step S513, the system control unit 50 displays a guide indicating that the buffer use status for the card 1 is being displayed on the display unit 28.

Figure 6B:
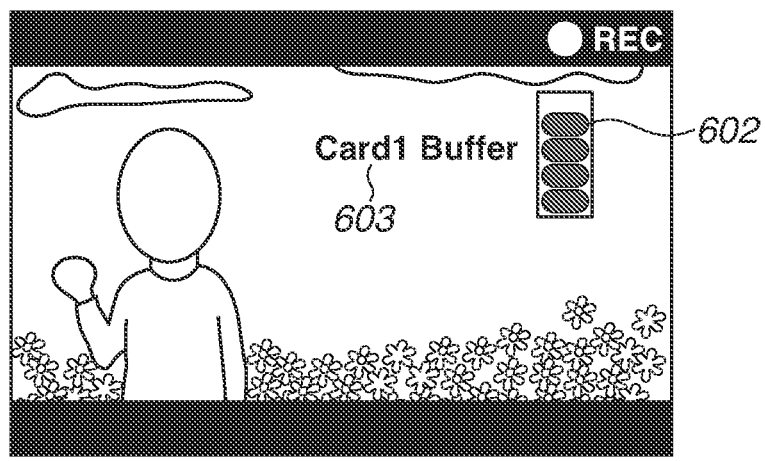

FIG. 6B illustrates an example of displaying performed to display the buffer use status of the buffer for the card 1. An indication 602 indicates the buffer use status of the buffer for the card 1 and is displayed in the form of a progress gauge. A guide indication 603 indicates that displaying of the use status of the buffer which is currently displayed is the use status of the buffer for the card 1. Furthermore, as illustrated in FIG. 6B, the buffer use status indication 602 and the guide indication 603 are displayed together with a captured moving image, i.e., a live view image.

In a case where the use status of the buffer for the card 2 is greater than or equal to the use status of the buffer for the card 1, then in step S514, the system control unit 50 displays, as the use status of the buffer for the card 2, the used amount of the buffer for the card 2 in red.

In step S515, the system control unit 50 displays a guide indicating that the buffer use status for the card 2 is being displayed on the display unit 28.

Figure 6C:
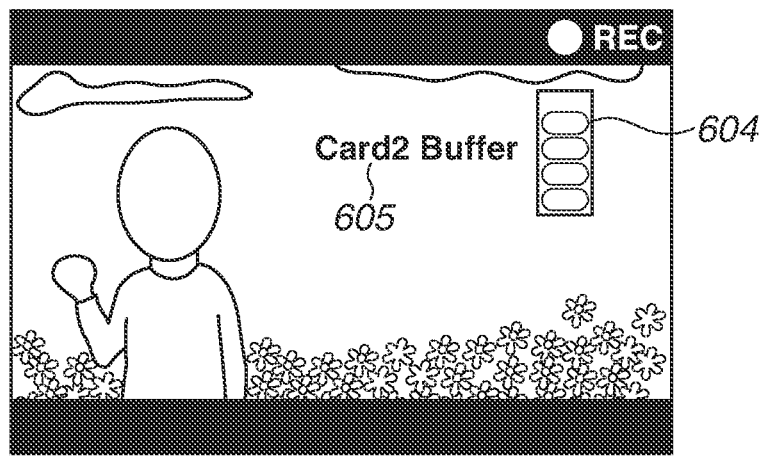

FIG. 6C illustrates an example of displaying performed to display the buffer use status of the buffer for the card 2. An indication 604 indicates the buffer use status of the buffer for the card 2 and is displayed in the form of a progress gauge. A guide indication 605 indicates that displaying of the use status of the buffer which is currently displayed is the use status of the buffer for the card 2. Furthermore, as illustrated in FIG. 6C, the buffer use status indication 604 and the guide indication 605 are displayed together with a captured moving image, i.e., a live view image.

In step S516, the system control unit 50 determines whether a moving image recording stop instruction has been issued by the LV button 76 being pressed. If it is determined that the moving image recording stop instruction has been issued (YES in step S516), the system control unit 50 advances the processing to step S521, and, if it is determined that the moving image recording stop instruction has not been issued (NO in step S516), the system control unit 50 advances the processing to step S517.

In step S517, the system control unit 50 determines whether the use status of the buffer for the card 1 or the buffer for the card 2 has reached a full capacity, in other words, whether it has become impossible to store any further moving image data in the buffer. The system control unit 50 can be configured not to determine that the use status of the buffer has reached a full capacity in response to the usage rate of the buffer reaching 100% but to determine that the use status of the buffer has reached a full capacity in response to the usage rate of the buffer reaching 90%. If it is determined that the use status of the buffer for the card 1 or the buffer for the card 2 has reached a full capacity (YES in step S517), the system control unit 50 advances the processing to step S518, and, if it is determined that neither of the use status of the buffer for the card 1 and the buffer for the card 2 has reached a full capacity (NO in step S517), the system control unit 50 returns the processing to step S504. In this way, the system control unit 50 stops image capturing of moving image data in response to any one of the buffer for the card 1 and the buffer for the card 2 reaching a full capacity. Stop processing for image capturing is described below in step S521.

In step S518, the system control unit 50 determines whether the buffer the use status of which has reached a full capacity is the buffer for the card 1. If it is determined that the buffer the use status of which has reached a full capacity is the buffer for the card 1 (YES in step S518), the system control unit 50 advances the processing to step S519, and, if it is determined that the buffer the use status of which has reached a full capacity is not the buffer for the card 1 but the buffer for the card 2 (NO in step S518), the system control unit 50 advances the processing to step S520.

Figure 7B:
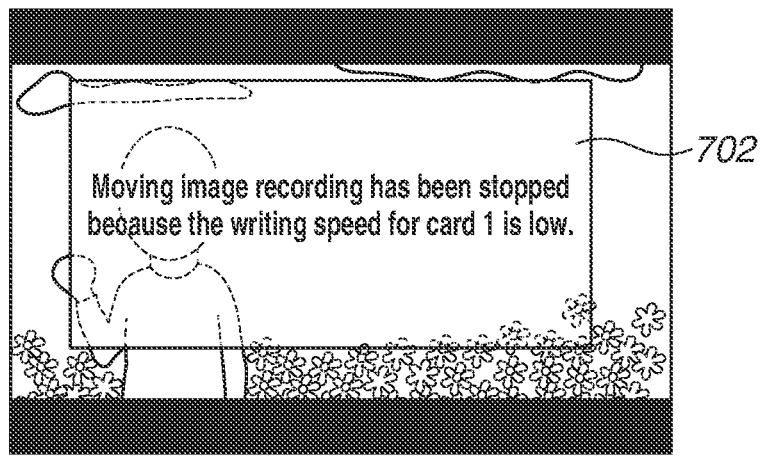

In step S519, the system control unit 50 displays, on the display unit 28, a moving image recording stop notification due to the use status of the buffer for the card 1 reaching a full capacity. FIG. 7B illustrates a display example of the moving image recording stop notification displayed at that time. An indication 702 indicates that moving image recording has been stopped due to the use status of the buffer for the card 1 reaching a full capacity.

Figure 7C:
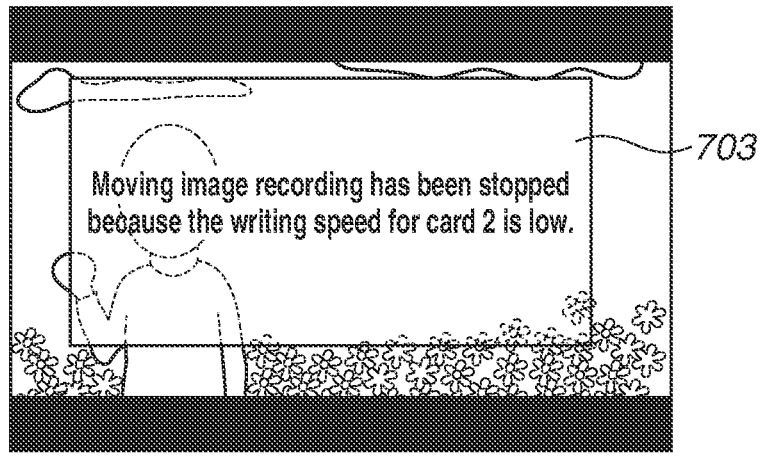

In step S520, the system control unit 50 displays, on the display unit 28, a moving image recording stop notification due to the use status of the buffer for the card 2 reaching a full capacity. FIG. 7C illustrates a display example of the moving image recording stop notification displayed at that time. An indication 703 indicates that moving image recording has been stopped due to the use status of the buffer for the card 2 reaching a full capacity.

In step S521, the system control unit 50 performs moving image recording stop processing. In the moving image recording stop processing, the system control unit 50 stops signal readout from the imaging unit 22, and stops storing any further moving image data in both the buffer for the card 1 and the buffer for the card 2. Then, the system control unit 50 records, on the card 1, moving image data temporarily stored so far in the buffer for the card 1 and not yet recorded on the card 1, and records, on the card 2, moving image data temporarily stored so far in the buffer for the card 2 and not yet recorded on the card 2.

Furthermore, it is assumed that, in a case where an abnormal operation, such as rotating, for example, a mode dial, has been performed during the present flow, the flow may be interrupted on the way.

In this way, in the present exemplary embodiment, the system control unit 50 is configured to display only the use status of one buffer out of the use status of the buffer for the card 1 and the use status of the buffer for the card 2. Therefore, the system control unit 50 is able to display the use status of the buffer without an image to be displayed together therewith being hidden to a large extent. Moreover, since the system control unit 50 displays only the use status of a buffer the use status of which is larger, the user is enabled to recognize a progress leading to a situation in which the buffer becomes full in capacity and image capturing urgently stops, without the system control unit 50 displaying the use statuses of a plurality of buffers.

Displaying the buffer use status of the buffer for the card 1 and the buffer use status of the buffer for the card 2 in respective different colors enables the user to recognize that the buffer use status which is currently displayed is the use status of a buffer corresponding to the card 1 or the card 2.

The present exemplary embodiment is configured to display the buffer use status with a progress gauge indicating the used amount or usage rate of the buffer, but can be configured to display the buffer use status with a different display form.

The present exemplary embodiment is configured to display information indicating a card corresponding to the buffer, but, in a case where the recording image quality differs depending on cards, the present exemplary embodiment can be configured to display information indicating the recording image quality. Moreover, in a case where the card 1 and the card 2 differ from each other in card type, the present exemplary embodiment can be configured to display the type of a card.

While, in the present exemplary embodiment, a case where recording is simultaneously performed on two memory cards has been described, the present exemplary embodiment can also be applied to a case where recording is simultaneously performed on three or more memory cards. In this case, the present exemplary embodiment can be configured to determine a buffer which is the largest in the used amount, the usage rate, or the number of image frames accumulated in the buffer and to display the use status of the buffer which is the largest in use status. In the present exemplary embodiment, a case where moving image data is simultaneously recorded has been described. However, the present exemplary embodiment can also be applied to not only a case where moving image data is simultaneously recorded on a plurality of memory cards but also a case where continuously-captured image data obtained by continuous still image capturing is simultaneously recorded. Thus, the present disclosure can be implemented with respect to a case where a plurality of pieces of image data is acquired as continuous image data by moving image capturing or continuous still image capturing and the continuous image data is recorded on a plurality of recording media.

Figure 8A:
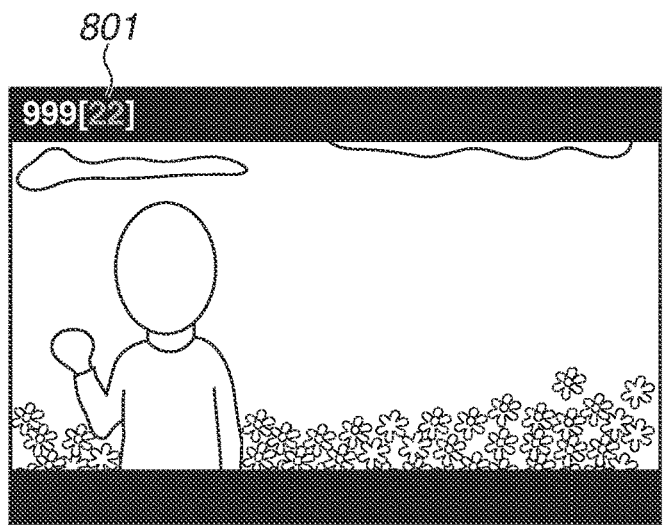
FIGS. 8A, 8B, and 8C are diagrams illustrating still image captured screens obtained by the digital camera in the exemplary embodiment.
Figure 8B:
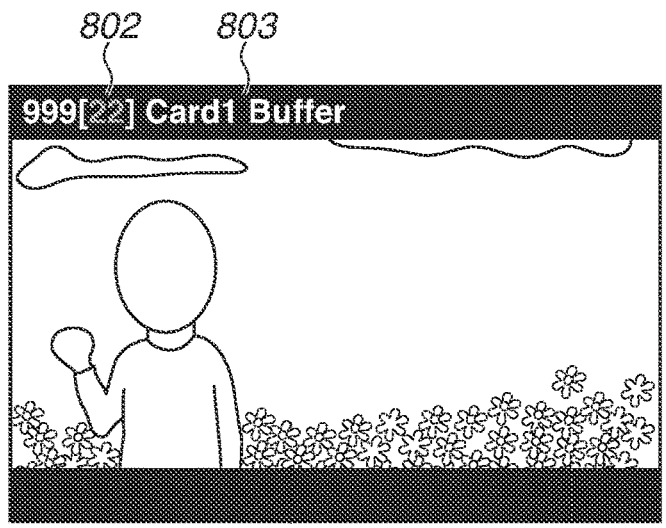
Figure 8C:
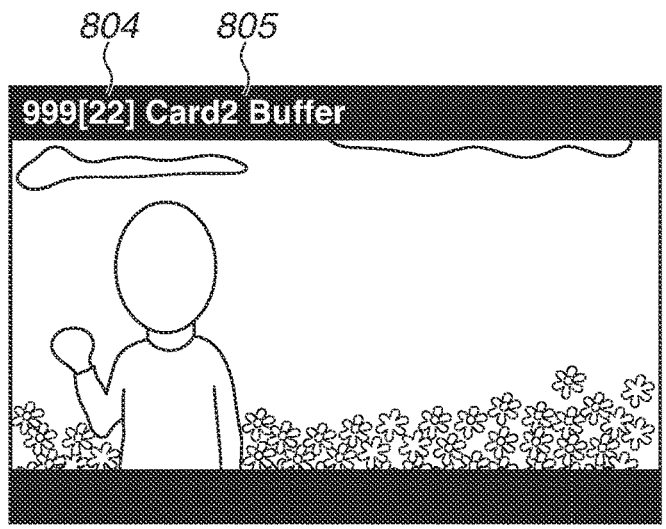

The present exemplary embodiment can be configured to display the used amount or usage rate of the buffer as the use status of the buffer in the case of moving image capturing and to display the number of pieces of image data temporarily stored in the buffer but not yet recorded on the card, as illustrated in FIGS. 8A, 8B, and 8C, in the case of continuous still image capturing. An indication 801 illustrated in FIG. 8A is an example in which, during still image capturing, the buffer use status to be displayed on the display unit 28 is expressed in the form of the remaining number of images capturable by continuous image capturing. FIG. 8B illustrates a display example of the buffer use status obtained at the time of simultaneous recording on a plurality of memory cards during continuous still image capturing, in which, since the usage rate of the buffer for the card 1 is larger than that of the buffer for the card 2, a use status 802 of the buffer for the card 1 is displayed as the remaining number of images capturable by continuous image capturing. Moreover, a guide 803 indicating that the use status of the buffer for the card 1 is currently displayed is also displayed. FIG. 8C illustrates a display example of the buffer use status obtained at the time of simultaneous recording on a plurality of memory cards during continuous still image capturing, in which, since the usage rate of the buffer for the card 2 is larger than that of the buffer for the card 1, a use status 804 of the buffer for the card 2 is displayed as the remaining number of images capturable by continuous image capturing. Moreover, a guide 805 indicating that the use status of the buffer for the card 2 is currently displayed is also displayed.

Furthermore, according to the flowchart illustrated in FIG. 5, display processing for the use status of the buffer is performed until image capturing is stopped. Therefore, if the use status of the buffer for the card 1 and the use status of the buffer for the card 2 change in such a manner that the buffer the use status of which is larger changes, the system control unit 50 also changes the use status of a buffer to be displayed on the display unit 28. More specifically, the system control unit 50 performs such a change in such a way as to display the use status of a buffer the use status of which is larger at that time out of the buffer for the card 1 and the buffer for the card 2.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-085968 filed Apr. 26, 2019, which is hereby incorporated by reference herein in its entirety.

What is claimed is:

1. An imaging apparatus comprising:
   an image sensor;
   at least one processor; and
   a memory coupled to the at least one processor, the memory having instructions that, when executed by the at least processor, performs operations as:
      a storing control unit configured to perform control to, when recording pieces of image data obtained by the image sensor on a plurality of recording media, respectively temporarily store the pieces of image data obtained by the image sensor in a plurality of storage regions corresponding to the plurality of recording media;
      a recording control unit configured to perform control to respectively record the pieces of image data temporarily stored in the plurality of storage regions on the plurality of recording media corresponding to the plurality of storage regions; and
      a display control unit configured to perform control to display information indicating a use status of a storage region on a display unit,
      wherein the display control unit performs control to display information indicating the use status only with respect to one storage region out of the plurality of storage regions, and
      wherein, based on a used amount of the storage region, a usage rate of the storage region, or a number of pieces of image data temporarily stored in the storage region, the display control unit determines the one storage region with respect to which the information indicating the use status is to be displayed out of the plurality of storage regions.

2. The imaging apparatus according to claim 1, wherein the display control unit performs control to display information indicating the use status with respect to a storage region which is the largest in a used amount of a storage region, a usage rate of a storage region, or a number of pieces of image data temporarily stored in a storage region out of the plurality of storage regions.

3. The imaging apparatus according to claim 1, wherein the display control unit changes a storage region with respect to which information indicating the use status is displayed out of the plurality of storage regions according to a used amount of a storage region, a usage rate of a storage region, or a number of pieces of image data temporarily stored in a storage region.

4. The imaging apparatus according to claim 1, wherein the display control unit performs control to displays information indicating the use status on the display unit in such a manner that a use status of which storage region of the plurality of storage regions the use status indicated by the information is recognizable.

5. The imaging apparatus according to claim 4, wherein the display control unit performs control to display, together with information indicating the use status, information about a recording medium on which to record image data temporarily stored in a storage region with respect to which information indicating the use status is displayed out of the plurality of storage regions.

6. The imaging apparatus according to claim 1, wherein, in a case where a use status of any one of the plurality of storage regions has become a predetermined status, the display control unit performs control to display a use status of the storage region the use status of which has become the predetermined status, and, in a case where none of the plurality of storage regions has become the predetermined status, the display control unit performs control not to display a use status of any storage region.

7. The imaging apparatus according to claim 6, wherein, in a case where, in any one of the plurality of storage regions, a used amount of the storage region, a usage rate of the storage region, or a number of pieces of image data temporarily stored in the storage region has exceeded a threshold value, the display control unit performs control to display a use status of the storage region with respect to which the threshold value has been exceeded, and, in a case where the threshold value has been exceeded with respect to none of the plurality of storage regions, the display control unit performs control not to display a use status of any storage region.

8. The imaging apparatus according to claim 7, wherein the at least processor further performs operations as: a setting unit configured to set an image quality of image data to be recorded on a recording medium.

9. The imaging apparatus according to claim 8, wherein the threshold value is a value corresponding to the image quality set by the setting unit.

10. The imaging apparatus according to claim 9,
    wherein the setting unit is able to set raw image data and developed image data as the image quality of image data, and
    wherein, in a case where raw image data is to be recorded on a recording medium, a first value is set as the threshold value, and, in a case where developed image data is to be recorded on a recording medium without raw image data not being recorded thereon, a second value smaller than the first value is set as the threshold value.

11. The imaging apparatus according to claim 1, wherein, in a case where temporary storing of further image data in any one of the plurality of storage regions has become impossible, the storing control unit stops temporary storing of further image data in the plurality of storage regions, the recording control unit performs control to record, on the plurality of recording media, image data temporarily stored in the plurality of storage regions until the temporary storing is stopped, and the display control unit performs control to display information about a recording medium corresponding to a storage region in which temporary storing of further image data has become impossible out of the plurality of storage regions.

12. The imaging apparatus according to claim 1,
wherein pieces of image data having respective different image qualities are able to be recorded on the plurality of recording media, and
wherein each of the plurality of storage regions is configured to temporary store therein image data having an image quality that is to be recorded on a recording medium corresponding to each storage region.

13. The imaging apparatus according to claim 12, wherein the display control unit performs control to display, together with information indicating the use status, information about an image quality of image data to be recorded on a recording medium corresponding to a storage region with respect to which information indicating the use status is displayed out of the plurality of storage regions, in such a manner that a use status of which storage region of the plurality of storage regions the use status indicated by the information is recognizable.

14. The imaging apparatus according to claim 13, wherein, in a case where temporary storing of further image data in any one of the plurality of storage regions has become impossible, the storing control unit stops temporary storing of further image data in the plurality of storage regions, the recording control unit performs control to record, on the plurality of recording media, image data temporarily stored in the plurality of storage regions until the temporary storing is stopped, and the display control unit performs control to display information about an image quality of image data corresponding to a storage region in which temporary storing of further image data has become impossible out of the plurality of storage regions.

15. The imaging apparatus according to claim 1, wherein the display control unit performs control to display, on the display unit, information indicating the use status of the storage region together with image data acquired by the image sensor.

16. The imaging apparatus according to claim 1, wherein the pieces of image data are continuous image data obtained by moving image capturing or continuous still image capturing.

17. The imaging apparatus according to claim 1, wherein the plurality of storage regions is storage regions provided in an identical memory.

18. The imaging apparatus according to claim 1, wherein the plurality of storage regions is storage regions provided in different memories.

19. A display control method comprising:
when recording pieces of image data obtained by an image sensor on a plurality of recording media, respectively temporarily storing the pieces of image data obtained by the image sensor in a plurality of storage regions corresponding to the plurality of recording media;
performing control to respectively record the pieces of image data temporarily stored in the plurality of storage regions on the plurality of recording media corresponding to the plurality of storage regions;
performing control to display information indicating a use status of a storage region on a display unit; and
performing control to display information indicating the use status only with respect to one storage region out of the plurality of storage regions,
wherein, based on a used amount of the storage region, a usage rate of the storage region, or a number of pieces of image data temporarily stored in the storage region, the display control unit determines the one storage region with respect to which the information indicating the use status is to be displayed out of the plurality of storage regions.

20. A non-transitory computer-readable storage medium storing computer-executable instructions that, when executed by a computer, cause the computer to perform a display control method comprising:
when recording pieces of image data obtained by an image sensor on a plurality of recording media, respectively temporarily storing the pieces of image data obtained by the image sensor in a plurality of storage regions corresponding to the plurality of recording media;
performing control to respectively record the pieces of image data temporarily stored in the plurality of storage regions on the plurality of recording media corresponding to the plurality of storage regions;
performing control to display information indicating a use status of a storage region on a display unit; and
performing control to display information indicating the use status only with respect to one storage region out of the plurality of storage regions,
wherein, based on a used amount of the storage region, a usage rate of the storage region, or a number of pieces of image data temporarily stored in the storage region, the display control unit determines the one storage region with respect to which the information indicating the use status is to be displayed out of the plurality of storage regions.

* * * * *